Patented Dec. 5, 1922.

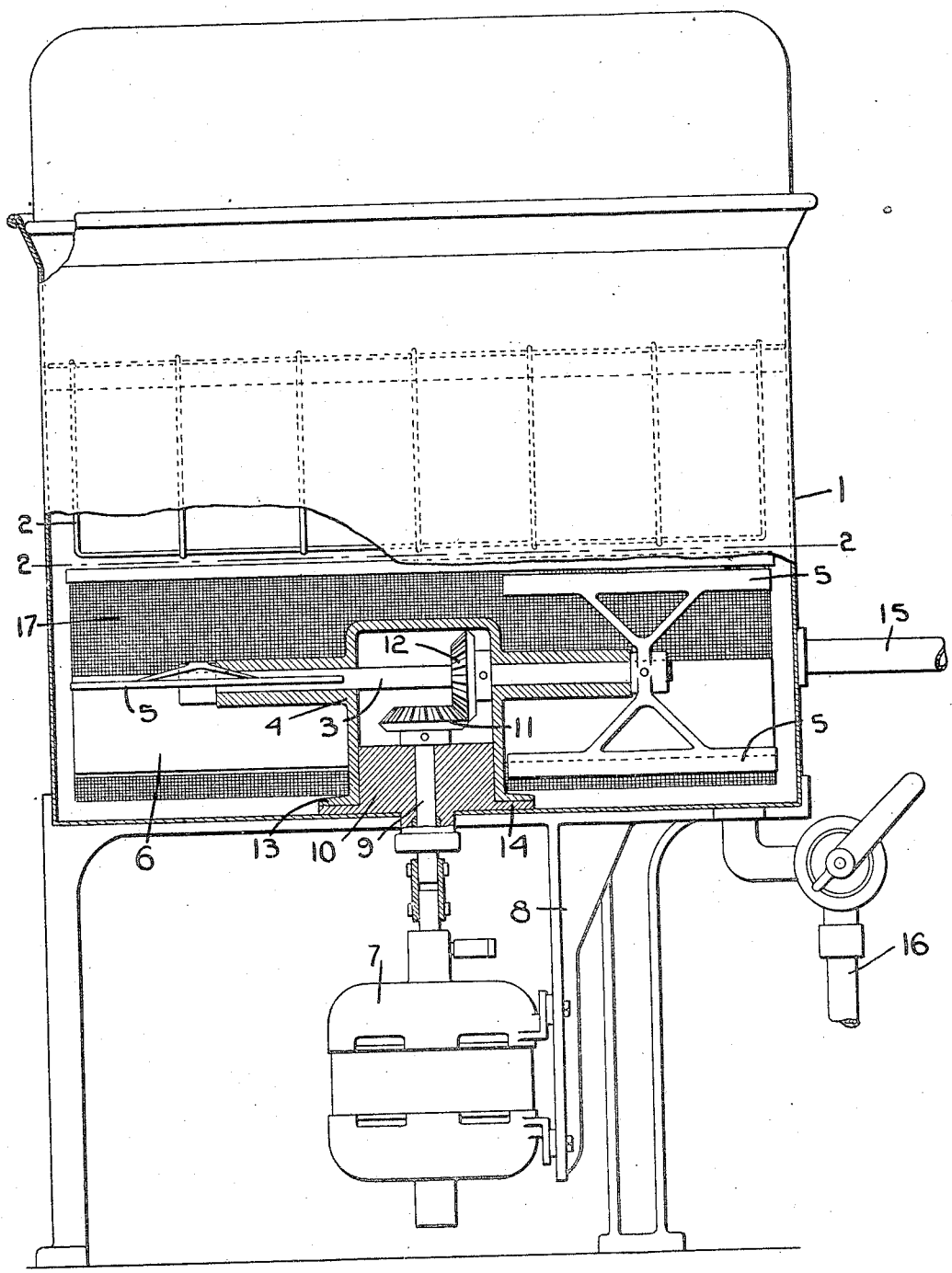

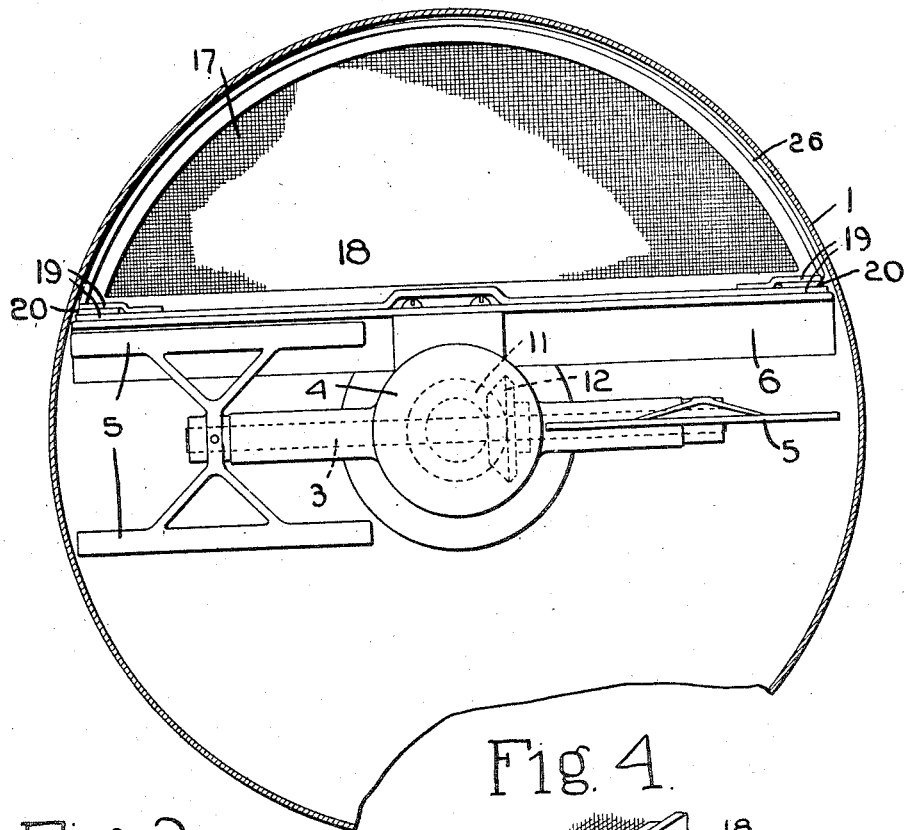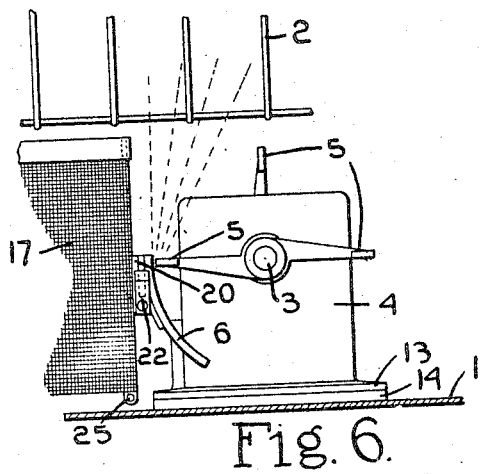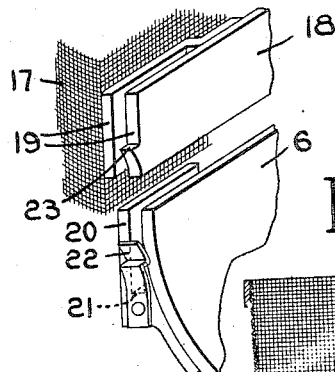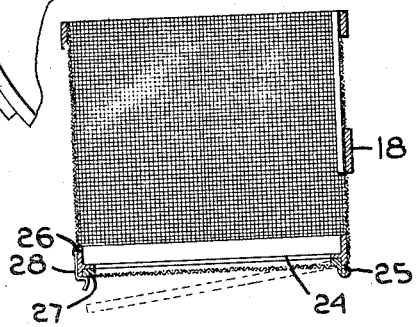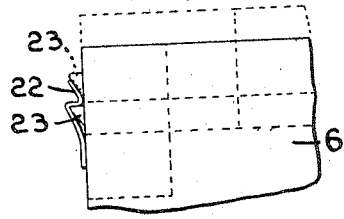

1,437,403

UNITED STATES PATENT OFFICE.

CHARLES F. DOBLE, OF BROOKLINE, MASSACHUSETTS.

DISHWASHING MACHINE.

Application filed March 7, 1921. Serial No. 450,287.

*To all whom it may concern:*

Be it known that I, CHARLES F. DOBLE, a citizen of the United States, and resident of Brookline, county of Norfolk, State of Massachusetts, have invented an Improvement in Dishwashing Machines, of which the following description, in connection with the accompanying drawing, is a specification, like characters on the drawing representing like parts.

This invention relates to dish washing machines of that type comprising a tank or vessel to contain water with means for supporting the dishes above the water therein and means below the dishes operating to throw or project the water upwardly onto the dishes. One object of the invention is to provide an improved construction by which the solid material which is washed from the dishes will be automatically separated from the water so that the water which is continually dashed against the dishes will be relatively free from solid matter.

Another object of the invention is to provide an improved form of mechanism for projecting or dashing the water against the dishes and still other objects are to improve generally dish washing machines of this type all as will be more fully hereinafter set forth.

In order to give an understanding of my invention I have illustrated in the drawings a selected embodiment thereof which will now be described after which the novel features will be pointed out in the appended claims.

Fig. 1 is a side view of a dish washing machine embodying my invention with a portion broken out to show the interior construction.

Fig. 2 is a section on the line 2—2, Fig. 1.

Fig. 3 is a detail view showing a portion of the strainer for removing the solid matter and also showing the means for projecting the water against the dishes.

Fig. 4 is a fragmentary detail view showing the way in which the screen is held in position.

Fig. 5 is a cross sectional view through the screen.

Fig. 6 is a front view of Fig. 4.

The washing machine herein shown is of that type which comprises a cylindrical metal tank or vessel 1 adapted to contain water and having therein a basket 2 to contain the dishes to be washed, said basket having a skeleton construction so that it does not form any obstruction to the water which is dashed over the dishes contained therein. Situated beneath the basket is a mechanism for throwing the water upwardly onto the dishes in all directions. Said mechanism comprises a horizontal shaft 3 journalled in a rotary support 4 and carrying on its ends blades 5. The rotary support 4 has secured thereto a curved apron 6 situated so that as the blades 5 rotate they pass in close proximity to the apron. The shaft 3 is driven from a motor 7 secured to a bracket 8 depending from the vessel 1, the shaft of said motor being connected to a shaft section 9 journalled in a bearing 10 secured to the bottom of the vessel 1 and said shaft section 9 having a bevelled gear 11 which meshes with a bevelled gear 12 on the shaft 3. The support 4 is hollow and the gears 11 and 12 are situated within said support. Said support 4 has a flange 13 at its bottom which rests loosely on a flange 14 formed on the bearing 10 so that the support 4 is free to be turned about the bearing 10.

In the operation of the device the dishes are placed in the basket 2 and water is admitted to the vessel 1 through an inlet pipe 15 until there is sufficient water in the vessel so that the blades will dip well into the body of water as they are rotated. When the motor is started the shaft 3 is rapidly rotated and the blades 5 pick up the water and throw it upwardly against the dishes with great force. The deflector or apron 6 cooperates with the blades in performing this function because the deflector prevents the water from being thrown laterally by each blade as it passes over the surface of the deflector so that all the water will be thrown upwardly as indicated in Fig. 3.

Since the support 4 is loosely resting on the bearing 10 and can turn freely about the bearing it will follow that the resistance which the water offers to the rotation of the shaft 3 will cause part of the force applied to gear 12 to turn the support 4 about the vertical axis so that the blades 5 not only have a rapid rotation about the horizontal axis of the shaft 3 but they also revolve about a vertical axis. In this way the water or cleansing fluid is thrown against the dishes in finely divided particles and also is thrown against all portions of the dishes and in various directions and at various angles so that the dishes are thoroughly cleansed.

After the dishes have been thoroughly cleansed the dirty water is drawn off through the drain pipe 16 and then rinsing water may be introduced into the machine for the purpose of rinsing the dishes.

Most dishes which require washing have more or less solid insoluble matter adhering to them and when said dishes are being washed in a dish washer of this type, such solid insoluble matter will be washed from the dishes and will drop into the water contained in the vessel and will then again be thrown back onto the dishes by the rotating blades.

An important feature of the present invention relates to means for separating such solid insoluble particles from the water which is thrown upwardly against the dishes by the blades.

I accomplish this by employing a screen so placed that the water which is acted upon by the blades has to pass through the screen before the blades act on it and in thus passing through the screen the solid matter is eliminated from the water so that the water which is thrown against the dishes by the blades will be free from solid matter.

In the construction herein shown the screen is so constructed and is placed in such a position that the water which drips from the dishes will drop onto the screen, said screen operating to retain the solid insoluble particles while permitting the water to pass through and to be again thrown onto the dishes.

In the type of dish washing machine herein illustrated the water is thrown upwardly against the dishes throughout a portion only of the vessel, that is, throughout the portion of the vessel situated in front of the apron 6, as indicated in Fig. 3. At the portion to the left of the apron 6 in Fig. 3 or above the apron in Fig. 2, there is substantially no water thrown upwardly against the dishes but at this portion of the vessel the water which drains off from the dishes is free to drop to the bottom of the vessel without interference from the water which is thrown upwardly by the blades 5.

I propose to place a screen at this portion of the vessel and this screen may be conveniently attached to and carried by the apron 6 so that it will rotate with the apron. With such arrangement the screen is always occupying that portion of the vessel where the water is dripping freely from the dishes but does not interfere at all with the throwing of the water upwardly against the dishes by the blades 5.

This screen may assume different forms without departing from my invention. I will preferably employ a screen in the form of a basket having reticulated walls such as would be formed by fine wire mesh. Such a basket is shown at 17 and it is of a cross sectional shape to fit the space within the vessel 1 at the rear of the apron 6.

The basket 17 may be retained in place in any suitable way. Said basket has one straight side which lies along the back of the deflector or apron 6 and a curved side which follows the contour of the receptacle or vessel 1. The basket is provided with a bar 18 extending along the straight side thereof, said bar having the forked ends 19, and the apron 6 is provided at each end with the upstanding finger 20 adapted to enter between the arms of one of the forks 19. Each finger 20 is provided with the rest or seat 21 on which the end of the bar 18 rests and the basket is held in position by means of spring catches 22 adapted to yieldingly engage shoulders 23 formed on the end of the bar 18. This provides a simple way of detachably supporting the basket and providing for its ready removal.

I may, if desired, make the basket 17 with a hinged bottom as shown in Fig. 5, wherein the bottom indicated at 24 is hinged to the straight side of the basket as shown at 25. The basket is made with the frame work 26 at the bottom to which the wire netting is secured and the bottom 24 is also formed with the skeleton frame 27 carrying wire screen. This frame 27 is hinged to the frame 26 as indicated at 25 and any suitable catch 28 may be used for holding the bottom in position. The provision of the hinged bottom facilitates the cleaning of the basket.

With the above arrangement the basket or screen 17 occupies the portion of the vessel 1 within which there is no appreciable upward movement of water because of the rotating blades 5 and consequently at this portion of the vessel the water is dripping freely from the dishes. At the other portion of the vessel much of the water which tends to drip from the dishes is thrown back again by the action of the blades.

With the above arrangement therefore the greater portion of the water which drips from the dishes will fall onto the screen and the latter will operate to separate the solid insoluble particles from the fluid which freely flows through the screen. As a result the solid matter is progressively caught by the screen and the water or cleansing fluid is kept relatively free from such solid matter.

In this type of dish washing machine where the support 4 has a gradual rotative movement during the operation of the machine the screen 17 will be carried around under different portions of the dishes so as catch the drippings from off the dishes.

I have thus provided a dish washing machine with means for automatically and progressively separating the solid insoluble particles from the cleansing fluid and while I have herein illustrated one way in which this may be accomplished, yet I do not wish to be limited to the constructional features shown.

I claim:

1. In a dish washing machine, the combination with a receptacle containing a cleansing fluid, of means to support the dishes in a receptacle above the fluid, means beneath the dishes for projecting the cleansing fluid upwardly against the dishes, said means comprising an element rotatable about a horizontal axis to project the cleansing fluid upwardly and also rotatable about a vertical axis, and a screen rotatable with said means about its vertical axis and operating to separate the solid insoluble particles from the cleansing fluid.

2. In a dish washing machine, the combination with a vessel containing a cleansing fluid, of means for supporting the dishes in the vessel above the cleansing fluid, blades rotatable about a horizontal axis and adapted by their rotation to throw the water upwardly against the dishes, said blades being also rotatable as a unit about a vertical axis during their rotation about the horizontal axis, and means to separate the solid insoluble matter from the fluid which is thrown upwardly against the dishes by the blades.

3. In a dish washing machine, the combination with a vessel containing a cleansing fluid, of means to support the dishes in the vessel above the fluid, a support rotatable about a vertical axis, a deflecting apron carried by said support, means co-operating with said deflecting apron to project the cleansing fluid upwardly against the dishes, and a screen arranged to separate the solid insoluble matter from the cleansing fluid which is thrown upwardly.

4. In a dish washing machine, the combination with a receptacle containing a cleansing fluid, of means to support the dishes in the receptacle above the fluid, a support situated beneath the dishes and rotatable about a vertical axis, means carried by said support for projecting the cleansing fluid upwardly at different angles against the dishes, and a screen carried by said support and rotating therewith for separating the solid insoluble particles from the cleansing fluid.

5. In a dish washing machine, the combination with a receptacle containing a cleansing fluid, of means to support the dishes in the receptacle above the fluid, a support situated beneath the dishes and rotatable about a vertical axis, means carried by said support for projecting the cleansing fluid upwardly at different angles against the dishes, and a basket having reticulated sides carried by and rotating with said support and adapted to receive the drippings from the dishes, the reticulated walls of the basket allowing the fluid to drain out therefrom while retaining the solid insoluble matter.

6. In a dish washing machine, the combination with a vessel containing a cleansing fluid, of means to support dishes in the vessel above the fluid, a support rotatable about a vertical axis, a deflecting apron carried by said support, means co-operating with said deflecting apron to project cleansing fluid upwardly against the dishes and a screen carried by said apron and constructed to separate the solid insoluble matter from the cleansing fluid.

7. In a dish washing machine, the combination with a vessel containing a cleansing fluid, of means to support dishes within the vessel above the cleaning fluid, a support rotatably mounted in the vessel, means carried thereby to project cleansing fluid upwardly against the dishes throughout a portion only of the vessel, and a screen occupying the other portion of the vessel and adapted to receive the drippings from the dishes and to separate the solid matter from the cleansing fluid.

8. In a dish washing machine, the combination with a vessel, of means to support dishes within the vessel, means to project at any instant cleansing fluid against a portion only of the dishes contained in the receptacle and to cause said projecting means to move relative to the dishes so that the action thereof on the dishes will be progressive, and a screen situated to receive the dripping from the dishes that are not subject to the action of the projecting means, said screen separating the solid insoluble matter from the fluid.

9. In a dish washing machine, the combination with a receptacle containing a cleansing fluid, of means to support dishes in the receptacle above the fluid, a rotary element beneath the dishes for projecting the cleansing fluid upwardly against the dishes, means for rotating said element and giving it a bodily movement in addition to its rotary movement, and a screen partaking of said bodily movement and arranged to separate the solid particles from the cleansing fluid which is thrown upwardly against the dishes.

In testimony whereof, I have signed my name to this specification.

CHARLES F. DOBLE.